United States Patent
Johnson

(10) Patent No.: US 6,561,797 B1
(45) Date of Patent: May 13, 2003

(54) HEATING APPARATUS

(76) Inventor: Jerry B. Johnson, 1609 Hunt La., Pleasant View, TN (US) 37164

( * ) Notice: Subject to any disclaimer, the term of this patent is extended or adjusted under 35 U.S.C. 154(b) by 0 days.

(21) Appl. No.: 10/164,782

(22) Filed: Jun. 7, 2002

(51) Int. Cl.[7] .................................................. F24J 3/00
(52) U.S. Cl. ...................... 432/225; 432/224; 432/226; 432/230; 432/232
(58) Field of Search .................................. 432/224, 225, 432/226, 230, 232, 192, 143, 144

(56) References Cited

U.S. PATENT DOCUMENTS

| | | |
|---|---|---|
| 3,706,824 A | 12/1972 | Huber et al. |
| 3,843,858 A | 10/1974 | Buell |
| 3,957,032 A | 5/1976 | Jelesko |
| D315,596 S | 3/1991 | Botheras et al. |
| 5,017,760 A | 5/1991 | Miller |
| 5,853,289 A | 12/1998 | Todd et al. |
| 6,257,880 B1 * | 7/2001 | Hirayama .................... 432/225 |

* cited by examiner

Primary Examiner—Jiping Lu

(57) ABSTRACT

A heating apparatus for heating rigid plastic pipe for the purpose of bending and forming the pipe. The heating apparatus includes an elongate housing that has a bottom wall, a pair of side walls, a first end wall, and a second end wall to define an interior. Each of the end walls has a pipe hole for permitting a user to insert rigid plastic pipe through the interior. An elongate burner member burns combustible gas to produce heat and is mounted to the housing and is positioned in the interior proximate to the bottom wall. A valve assembly regulates a flow of the gas to the burner member. An elongate burner plate disperses the heat generated by the burner member and is positioned above the burner member. A plurality of pipe support members support the pipe above the burner plate while positioned in the interior of the housing. An elongate cover member selectively covers the opening to the interior of the housing.

19 Claims, 4 Drawing Sheets

HEATING APPARATUS

BACKGROUND OF THE INVENTION

1. Field of the Invention

The present invention relates to heaters and more particularly pertains to a new heating apparatus for heating rigid plastic pipe for the purpose of bending and forming the pipe.

2. Description of the Prior Art

The use of heaters is known in the prior art. U.S. Pat. No. 5,853,289 describes a gas-supplied pipe heater. Another type of heater is U.S. Pat. No. 5,017,760 which discloses a pipe heater having a heat sink pipe segment open at both ends with a resistance heating element wrapped around the exterior of the pipe segment.

While these devices fulfill their respective, particular objectives and requirements, the need remains for a device which more evenly heats the pipe.

SUMMARY OF THE INVENTION

The present invention meets the needs presented above by incorporating a dispersion plate above the burner member that has two rows of staggered holes spaced apart, and is sized such that there is a gap around the perimeter edge so that the heat flows through the holes and also around the plate.

Still yet another object of the present invention is to provide a new heating apparatus that that is specifically designed to be portable for use in the field and can be fueled by a standard propane tank such as those utilized for a typical gas grill.

Even still another object of the present invention is to provide a new heating apparatus that is large enough to accommodate longer length pipes permitting the use of larger radii bends, thereby expediting subsequent pulling operations, and by using the pipe support members in the interior also accommodates the shorter pipes.

To this end, the present invention generally comprises an elongate housing that has a bottom wall, a pair of side walls, a first end wall, and a second end wall to define an interior. Each of the end walls has a pipe hole for permitting a user to insert rigid plastic pipe through the interior. An elongate burner member burns combustible gas to produce heat and is mounted to the housing and is positioned in the interior proximate to the bottom wall. A valve assembly regulates a flow of the gas to the burner member. An elongate burner plate disperses the heat generated by the burner member and is positioned above the burner member. A plurality of pipe support members support the pipe above the burner plate while positioned in the interior of the housing. An elongate cover member selectively covers the opening to the interior of the housing.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
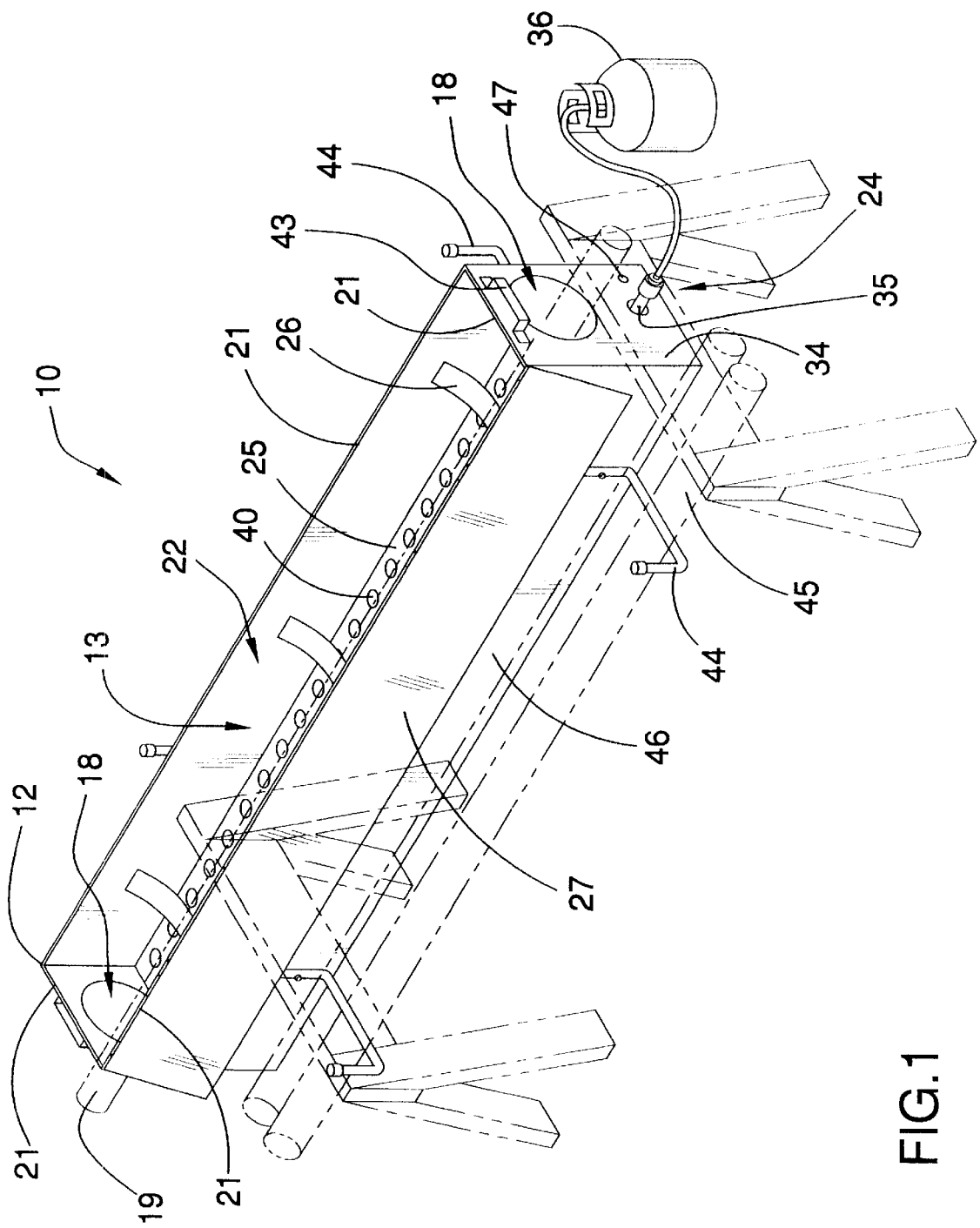
FIG. 1 is a schematic perspective view of a new heating apparatus according to the present invention.
Figure 2:
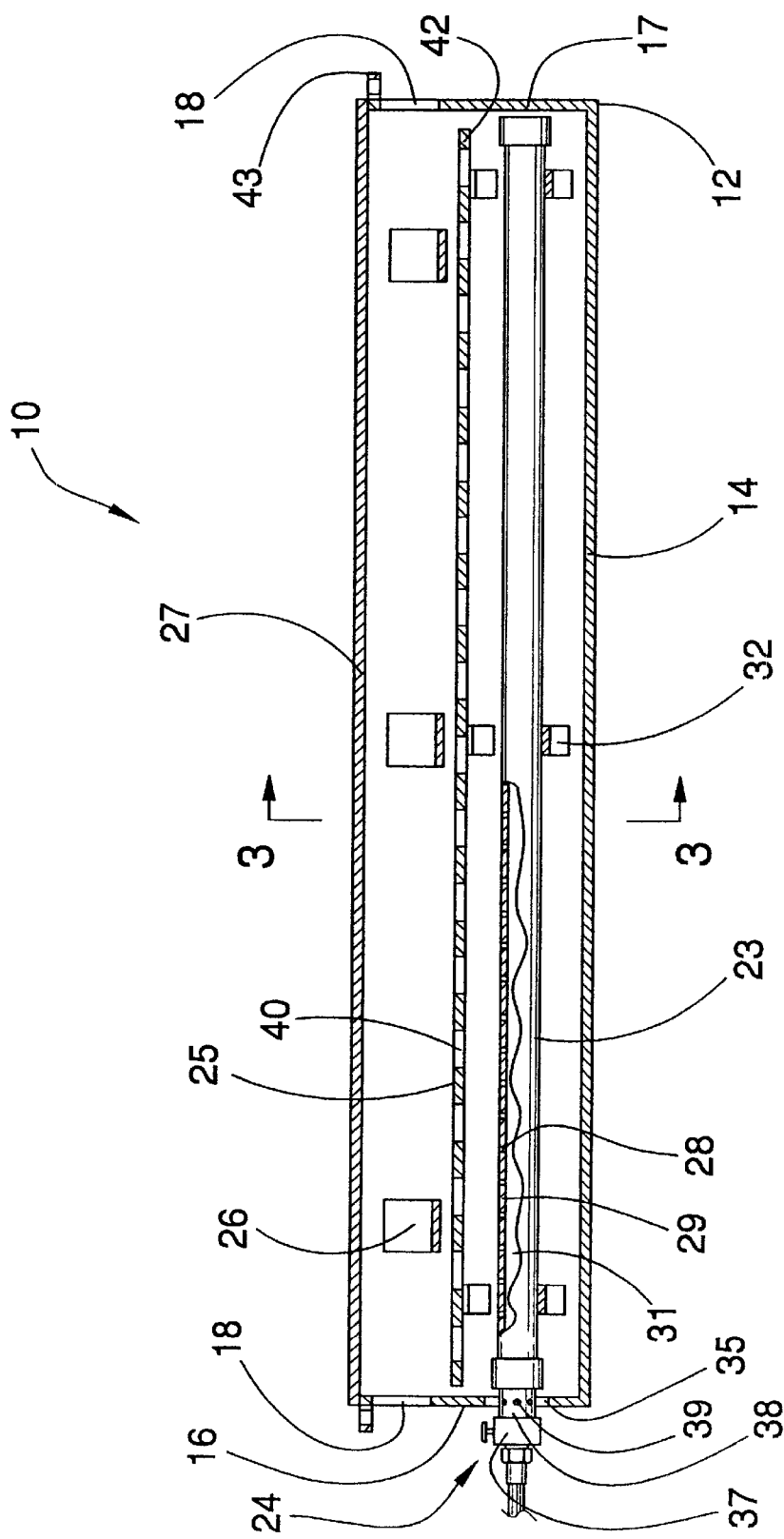
FIG. 2 is a schematic cross-sectional side view of the present invention.
Figure 3:
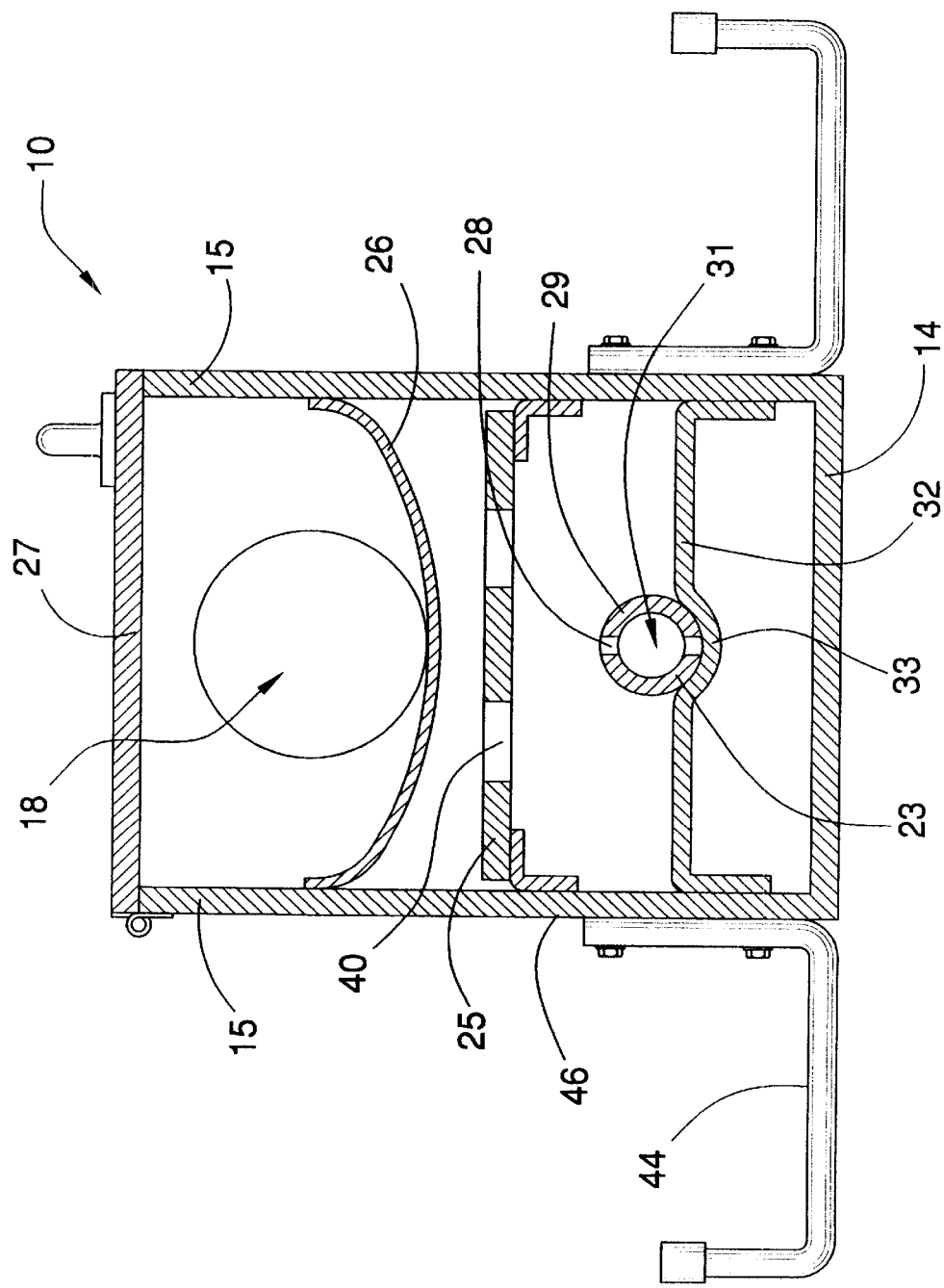
FIG. 3 is a schematic cross-sectional end view of the present invention.
Figure 4:
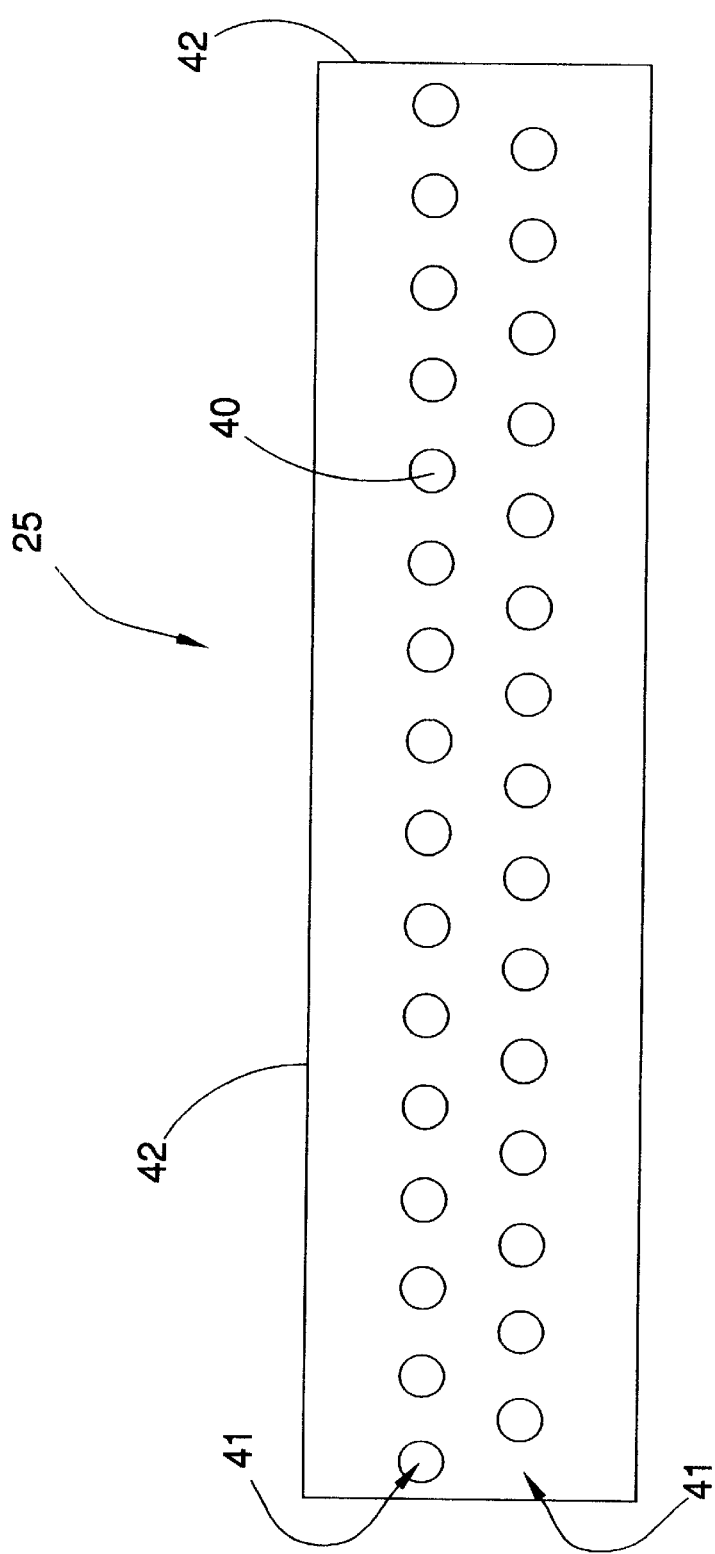
FIG. 4 is a schematic top view of the burner plate of the present invention.

With reference now to the drawings, and in particular to FIGS. 1 through 4 thereof, a new heating apparatus embodying the principles and concepts of the present invention and generally designated by the reference numeral 10 will be described.

As best illustrated in FIGS. 1 through 4, the heating apparatus 10 generally comprises an elongate housing 12 that has an interior 13. The housing 12 has a bottom wall 14, a pair of side walls 15, a first end wall 16, and a second end wall 17 to define the interior 13. Each of the end walls 16, 17 has a pipe hole 18 extending therethrough for permitting a user to insert rigid plastic pipe 19 through the interior 13. The pipe hole 18 is preferably 4" in diameter. Upper edges 21 of each of the walls define an opening 22 into the interior 13. The housing 12 has dimensions generally equal to 72" long by 17" high by 12½" wide and is preferably fabricated from brushed aluminum.

An elongate burner member 23 burns combustible gas to produce heat. The burner member 23 is mounted to the housing 12 and is positioned in the interior 13 proximate to the bottom wall 14.

A valve assembly 24 regulates a flow of the gas to the burner member 23.

An elongate burner plate 25 disperses the heat generated by the burner member 23. The burner plate 25 is mounted to the side walls 15 of the housing 12 and is positioned in the interior 13 above the burner member 23.

A plurality of pipe support members 26 supports the pipe 19 above the burner plate 25 while positioned in the interior 13 of the housing 12.

An elongate cover member 27 selectively covers the opening 22 to the interior 13 of the housing 12.

The burner member 23 includes a plurality of burner apertures 28 extending through a top wall 29 thereof to a chamber 31 of the burner member 23. The burner member 23 extends between the end walls 16, 17 of the housing 12 and is oriented substantially parallel to the bottom wall 14. The burner member 23 measures generally 60" long and is preferably a ¾" black steel pipe 19 with the burner apertures 28 preferably having a diameter of ⅜".

A plurality of burner support members 32 supports the burner member 23 and is mounted to and extends between the side walls 15 of the housing 12 and is spaced apart along a length of the housing 12. The burner member 23 is mounted to a central curved portion 33 of each of the burner support members 32.

The valve assembly 24 is mounted to a first end 34 of the burner member 23 and extends outwardly through a valve hole 35 in the first end wall 16. The valve assembly 24 is fluidly coupled to the burner member 23 such that the valve assembly 24 is in fluid communication with the chamber 31 of the burner member 23.

The valve assembly 24 is couplable to a gas supply 36 such that the gas passing through the burner apertures 28 is burnable in a controllable manner.

The valve assembly 24 includes a valve member 38 for selectively adjusting an amount of gas entering the burner member 23 such that an intensity of the heat generated by the burner member 23 in the interior 13 of the housing 12 is controllable.

The valve assembly 24 includes a tubular mixture section for mixing air with the gas as the gas enters the first end 34 of the burner member 23. The mixture section has a plurality of mixture ports 39 disposed therein. The ports are spaced about a circumference of the mixture section and are generally aligned with the valve hole 35 in the first end wall 16.

The burner plate 25 includes a plurality of bores 40 for permitting the heat from the burner member 23 to move upwardly. The plurality of bores 40 of the burner plate 25 comprises a pair of rows 41, each of which is oriented substantially parallel to a longitudinal axis of the housing 12. Each of the rows 41 of the bores 40 is equally spaced from a central longitudinal axis of the burner plate 25 and is offset with respect to each other forming a generally staggered configuration. The bores 40 are preferably 2" in diameter, and the rows 41 are generally spaced 2" apart.

The burner plate 25 extends between the end walls 16, 17 of the housing 12 and is oriented substantially parallel to the bottom wall 14. An outer edge 42 of the burner plate 25 is positioned away from each of the walls of the housing 12 permitting the heat from the burner member 23 to pass between the outer edge 42 and the walls to facilitate even heating about the pipe 19.

Each of the pipe support members 26 is mounted to and extends between the side walls 15 and is spaced apart along a length of the housing 12. Each of the pipe support members 26 is curved to facilitate centering of the pipe 19 within the interior 13 of the housing 12.

The cover member 27 is hingedly coupled to the upper edge of a first of the pair of the side walls 15.

The housing 12 includes a pair of support handles 43 that are mounted to each of the end walls 16, 17 and is located adjacent to the upper edges 21 thereof for the purpose of lifting the housing 12.

The housing 12 includes a plurality of rack members 44 for supporting pipe stock 45. Each of the rack members 44 is mounted on an outer surface 46 of each of the side walls 15 and is located proximate to each of the end walls 16, 17.

The housing 12 has an ignition aperture 47 for receiving an ignition means. The ignition aperture 47 is located adjacent to the valve hole 35 in the first end wall 16 such that the ignition means is positionable generally adjacent to the burner member 23 for the purpose of igniting the gas.

The ignition means is selected from a group consisting of a piezoelectric igniter, a tubular lighting torch, and elongate matches.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A heating apparatus for heating rigid plastic pipe for the purpose of bending and forming the pipe, said heating apparatus comprising:

an elongate housing having an interior, said housing having a bottom wall, a pair of side walls, a first end wall, and a second end wall defining said interior, each of said end walls having a pipe hole extending therethrough for permitting a user to insert rigid plastic pipe through said interior, upper edges of each of said walls defining an opening into said interior;

an elongate burner member for burning combustible gas to produce heat, said burner member being mounted to said housing and being positioned in said interior proximate to said bottom wall;

a valve assembly for regulating a flow of the gas to said burner member;

an elongate burner plate for dispersing the heat generated by said burner member, said burner plate being mounted to said side walls of said housing and being positioned in said interior above said burner member;

a plurality of pipe support members for supporting the pipe above said burner plate while positioned in said interior of said housing; and an elongate cover member for selectively covering said opening to said interior of said housing.

2. The heating apparatus as set forth in claim 1, further comprising said burner member including a plurality of burner apertures extending through a top wall thereof to a chamber of said burner member, said burner member extending between said end walls of said housing and being oriented substantially parallel to said bottom wall.

3. The heating apparatus as set forth in claim 2, further comprising said valve assembly being fluidly coupled to said burner member such that said valve assembly is in fluid communication with said chamber of said burner member.

4. The heating apparatus as set forth in claim 2, further comprising said valve assembly being couplable to a gas supply such that the gas passing through said burner apertures is burnable in a controllable manner.

5. The heating apparatus as set forth in claim 1, further comprising a plurality of burner support members for supporting said burner member, each of said burner support members being mounted to and extending between said side walls of said housing and being spaced apart along a length of said housing, wherein said burner member is mounted to a central curved portion of each of said burner support members.

6. The heating apparatus as set forth in claim 1, further comprising said valve assembly being mounted to a first end of said burner member and extending outwardly through a valve hole in said first end wall.

7. The heating apparatus as set forth in claim 6, further comprising said valve assembly including a tubular mixture section for mixing air with the gas as the gas enters said first end of said burner member, said mixture section having a plurality of mixture ports disposed therein, said ports being spaced about a circumference of said mixture section and being generally aligned with said valve hole in said first end wall.

8. The heating apparatus as set forth in claim 6, further comprising said housing having an ignition aperture for receiving an ignition means, said ignition aperture being located adjacent to said valve hole in said first end wall such that said ignition means is positionable generally adjacent to said burner member for the purpose of igniting the gas.

9. The heating apparatus as set forth in claim 8, wherein said ignition means is selected from a group consisting of a piezoelectric igniter, a tubular lighting torch, and elongated matches.

10. The heating apparatus as set forth in claim 1, further comprising said valve assembly including a valve member for selectively adjusting an amount of gas entering said burner member such that an intensity of the heat generated by said burner member in said interior of said housing is controllable.

11. The heating apparatus as set forth in claim 1, further comprising said burner plate including a plurality of bores extending therethrough for permitting the heat from said burner member to move upwardly.

12. The heating apparatus as set forth in claim 11, further comprising said plurality of bores of said burner plate comprising a pair of rows each being oriented substantially parallel to a longitudinal axis of said housing, each of said rows of said bores being equally spaced from a central longitudinal axis of said burner plate and being offset with respect to each other forming a generally staggered configuration.

13. The heating apparatus as set forth in claim 1, further comprising said burner plate extending between said end walls of said housing and being oriented substantially parallel to said bottom wall, an outer edge of said burner plate being positioned away from each of said walls of said housing permitting the heat from said burner member to pass between said outer edge and said walls to facilitate even heating about the pipe.

14. The heating apparatus as set forth in claim 1, further comprising each of said pipe support members being mounted to and extending between said side walls and being spaced apart along a length of said housing.

15. The heating apparatus as set forth in claim 1, further comprising each of said pipe support members being curved to facilitate centering of the pipe within said interior of said housing.

16. The heating apparatus as set forth in claim 1, further comprising said cover member being hingedly coupled to said upper edge of a first of said pair of said side walls.

17. The heating apparatus as set forth in claim 1, further comprising said housing including a pair of support handles being mounted to each of said end walls and being located adjacent to said upper edges thereof for the purpose of lifting said housing.

18. The heating apparatus as set forth in claim 1, further comprising said housing including a plurality of rack members for supporting pipe stock, each of said rack members being mounted on an outer surface of each of said side walls and being located proximate to each of said end walls.

19. A heating apparatus for heating rigid plastic pipe for the purpose of bending and forming the pipe, said heating apparatus comprising:

an elongate housing having an interior, said housing having a bottom wall, a pair of side walls, a first end wall, and a second end wall defining said interior, each of said end walls having a pipe hole extending therethrough for permitting a user to insert rigid plastic pipe through said interior, upper edges of each of said walls defining an opening into said interior;

an elongate burner member for burning combustible gas to produce heat, said burner member being mounted to said housing and being positioned in said interior proximate to said bottom wall;

a valve assembly for regulating a flow of the gas to said burner member;

an elongate burner plate for dispersing the heat generated by said burner member, said burner plate being mounted to said side walls of said housing and being positioned in said interior above said burner member;

a plurality of pipe support members for supporting the pipe above said burner plate while positioned in said interior of said housing;

an elongate cover member for selectively covering said opening to said interior of said housing;

said burner member including a plurality of burner apertures extending through a top wall thereof to a chamber of said burner member, said burner member extending between said end walls of said housing and being oriented substantially parallel to said bottom wall;

a plurality of burner support members for supporting said burner member, each of said burner support members being mounted to and extending between said side walls of said housing and being spaced apart along a length of said housing, wherein said burner member is mounted to a central curved portion of each of said burner support members;

said valve assembly being mounted to a first end of said burner member and extending outwardly through a valve hole in said first end wall;

said valve assembly being fluidly coupled to said burner member such that said valve assembly is in fluid communication with said chamber of said burner member;

said valve assembly being couplable to a gas supply such that the gas passing through said burner apertures is burnable in a controllable manner;

said valve assembly including a valve member for selectively adjusting an amount of gas entering said burner member such that an intensity of the heat generated by said burner member in said interior of said housing is controllable;

said valve assembly including a tubular mixture section for mixing air with the gas as the gas enters said first end of said burner member, said mixture section having a plurality of mixture ports disposed therein, said ports being spaced about a circumference of said mixture section and being generally aligned with said valve hole in said first end wall;

said burner plate including a plurality of bores extending therethrough for permitting the heat from said burner member to move upwardly;

said burner plate extending between said end walls of said housing and being oriented substantially parallel to said bottom wall, an outer edge of said burner plate being positioned away from each of said walls of said housing permitting the heat from said burner member to pass between said outer edge and said walls to facilitate even heating about the pipe;

said plurality of bores of said burner plate comprising a pair of rows each being oriented substantially parallel to a longitudinal axis of said housing, each of said rows of said bores being equally spaced from a central longitudinal axis of said burner plate and being offset with respect to each other forming a generally staggered configuration;

each of said pipe support members being mounted to and extending between said side walls and being spaced apart along a length of said housing;

each of said pipe support members being curved to facilitate centering of the pipe within said interior of said housing;

said cover member being hingedly coupled to said upper edge of a first of said pair of said side walls;

said housing including a pair of support handles being mounted to each of said end walls and being located adjacent to said upper edges thereof for the purpose of lifting said housing;

said housing including a plurality of rack members for supporting pipe stock, each of said rack members being mounted on an outer surface of each of said side walls and being located proximate to each of said end walls;

said housing having an ignition aperture for receiving an ignition means, said ignition aperture being located adjacent to said valve hole in said first end wall such that said ignition means is positionable generally adjacent to said burner member for the purpose of igniting the gas; and wherein said ignition means is selected from a group consisting of a piezoelectric igniter, a tubular lighting torch, and elongated matches.

* * * * *